United States Patent [19]
Friedman et al.

[11] Patent Number: 5,757,924
[45] Date of Patent: May 26, 1998

[54] NETWORK SECURITY DEVICE WHICH PERFORMS MAC ADDRESS TRANSLATION WITHOUT AFFECTING THE IP ADDRESS

[75] Inventors: Aharon Friedman, Shoreham; Ben Zion Levy, Stony Brook, both of N.Y.

[73] Assignee: Digital Secured Networks Techolognies, Inc., Ronkonkoma, N.Y.

[21] Appl. No.: 529,497

[22] Filed: Sep. 18, 1995

[51] Int. Cl.$^6$ ............................................. H04L 9/00
[52] U.S. Cl. ........................... 380/49; 380/21; 395/187.01
[58] Field of Search ................... 380/21, 49; 395/187.01

[56] References Cited

U.S. PATENT DOCUMENTS

| | | |
|---|---|---|
| 3,816,666 | 6/1974 | Tomozawa et al. . |
| 4,159,468 | 6/1979 | Barnes et al. . |
| 4,160,120 | 7/1979 | Barnes et al. . |
| 4,182,933 | 1/1980 | Rosenblum . |
| 4,185,166 | 1/1980 | Kinch, Jr. et al. . |

(List continued on next page.)

OTHER PUBLICATIONS

Menezes, Qu, and Vanstone, "Some New Key Arrangement Protocols Providing Implicit Authentication," Apr. 24, 1995.
Shmuely, *Composite Diffie–Hellman Public–Key Generating Systems Are Hard to Break*, Technion Technical Report, Feb. 1985.
Rabin, Digitized Signatures & Public–Key Functions As Intractable As Facturization, (date unknown).
Williams, A Modification of the RSA Public–Key Encryption Procedure, IEEE Transactions On Information Theory, vol. IT–26, No. 6, pp. 726–729 (Nov. 1980).
Miyaguch, *The FEAL Cipher Family*, Crypto '90 (Aug. 1990).
Shimizu, et al., FEAL–Fast Date Encipherment Algorithm, Systems & Computer in Japan, vol. 19, No. 7, pp. 20–34 (1988).
Federal Register, vol. 40, No. 52, Data Encryption Standard (Mar. 17, 1975).
Davies, et al., *Security for Computer Networks*, Chapters 3 (DES) and Chapter 4 (Block Cipher) pp. 47–108 (Wiley 1984).
Rivest, The MD5 Message–Digest Algorithm, Apr. 1992.
RSA Brochure (undated).
Diffie, *The First Ten Years of Public–Key Cryptography*, Proceedings of the IEEE, vol. 70, No. 5, pp. 560–577 (May 1988).
Fahn, *Answers to Frequently Asked Questions About Today's Cryptography*, RSA Laboratories (Sep. 1992).
Linn, *Privacy Enhancement for Internet Electronic Mail: Part I: Message Encryption and Authentication Procedures*, Network Working Group, RFC 1421 (Feb. 1993).
McCurley, A Key Distribution System Equivalent to Factoring, Jun. 3, 1987.
Kaliski, *Privacy Enhancement for Internet Electronic Mail: Part IV: Key Certification and Related Services*, Network Working Group, RFC 1424 (Feb. 1993).
Kent, *Privacy Enhancement for Internet Electronic Mail: Part II: Certificate–Based Key Management*, Network Working Group, RFC 1422 (Feb. 1993).

(List continued on next page.)

Primary Examiner—Thomas H. Tarcza
Assistant Examiner—Pinchus M. Laufer
Attorney, Agent, or Firm—Meltzer, Lippe Goldstein, et al.

[57] ABSTRACT

A network security device is connected between a protected client and a network. The network security device negotiates a session key with any other protected client. Then, all communications between the two clients are encrypted. The inventive device is self-configuring and locks itself to the IP address of its client. Thus, the client cannot change its IP address once set and therefore cannot emulate the IP address of another client. When a packet is transmitted from the protected host, the security device translates the MAC address of the client to its own MAC address before transmitting the packet into the network. Packets addressed to the host, contain the MAC address of the security device. The security device translates its MAC address to the client's MAC address before transmitting the packet to the client.

19 Claims, 6 Drawing Sheets

U.S. PATENT DOCUMENTS

| | | |
|---|---|---|
| 4,203,166 | 5/1980 | Ehrsam et al. |
| 4,227,253 | 10/1980 | Ehrsam et al. |
| 4,238,854 | 12/1980 | Ehrsam et al. |
| 4,249,180 | 2/1981 | Eberle et al. |
| 4,621,321 | 11/1986 | Boebert et al. |
| 4,633,391 | 12/1986 | Rundell. |
| 4,701,840 | 10/1987 | Boebert et al. |
| 4,713,753 | 12/1987 | Boebert et al. |
| 4,727,579 | 2/1988 | Wright et al. |
| 4,731,841 | 3/1988 | Rosen et al. |
| 4,757,536 | 7/1988 | Szczutkowski et al. |
| 4,799,153 | 1/1989 | Hann et al. ............ 380/25 X |
| 4,802,220 | 1/1989 | Marker, Jr. |
| 4,829,560 | 5/1989 | Evanyk et al. |
| 4,829,569 | 5/1989 | Seth-Smith et al. |
| 4,837,822 | 6/1989 | Crosly et al. |
| 4,901,348 | 2/1990 | Nichols et al. |
| 4,910,777 | 3/1990 | Larson et al. |
| 4,912,762 | 3/1990 | Lee et al. |
| 4,916,704 | 4/1990 | Bruckert et al. |
| 4,924,513 | 5/1990 | Herbison et al. ............ 380/21 |
| 4,933,969 | 6/1990 | Marshall et al. ............ 380/25 |
| 4,933,971 | 6/1990 | Bestock et al. |
| 4,956,803 | 9/1990 | Goss. |
| 4,965,804 | 10/1990 | Trobovich et al. |
| 4,980,913 | 12/1990 | Skret. |
| 4,991,207 | 2/1991 | Shiraishi et al. |
| 5,001,755 | 3/1991 | Skret. |
| 5,056,140 | 10/1991 | Kimbell. |
| 5,070,528 | 12/1991 | Hawe et al. |
| 5,086,469 | 2/1992 | Gupta et al. ............ 380/48 |
| 5,161,192 | 11/1992 | Carter et al. ............ 380/48 |
| 5,161,193 | 11/1992 | Lampson et al. ............ 380/49 |
| 5,177,788 | 1/1993 | Schanning et al. |
| 5,179,554 | 1/1993 | Lomicka et al. ............ 370/257 |
| 5,182,554 | 1/1993 | Kaiser et al. |
| 5,204,961 | 4/1993 | Barlow. |
| 5,222,137 | 6/1993 | Barrett et al. |
| 5,222,140 | 6/1993 | Beller et al. ............ 380/30 |
| 5,245,696 | 9/1993 | Loeb et al. ............ 380/23 |
| 5,261,003 | 11/1993 | Matsui. |
| 5,268,962 | 12/1993 | Abadi et al. |
| 5,272,754 | 12/1993 | Boebert. |
| 5,276,735 | 1/1994 | Boebert et al. |
| 5,299,263 | 3/1994 | Beller et al. ............ 380/30 |
| 5,303,303 | 4/1994 | White ............ 380/49 |
| 5,309,437 | 5/1994 | Perlman et al. |
| 5,311,593 | 5/1994 | Carmi ............ 380/23 |
| 5,331,637 | 7/1994 | Francis et al. |
| 5,353,283 | 10/1994 | Tsuchiya. |
| 5,361,359 | 11/1994 | Tajalli et al. |
| 5,386,470 | 1/1995 | Carter et al. ............ 380/48 |
| 5,386,471 | 1/1995 | Bianco. |
| 5,394,402 | 2/1995 | Ross ............ 370/402 |
| 5,394,469 | 2/1995 | Nagel et al. ............ 380/4 |
| 5,406,628 | 4/1995 | Beller et al. ............ 380/30 |
| 5,414,694 | 5/1995 | Crayford et al. ............ 380/50 X |
| 5,416,842 | 5/1995 | Aziz ............ 380/30 |
| 5,432,850 | 7/1995 | Rothenberg ............ 380/23 |
| 5,442,708 | 8/1995 | Adams, Jr. et al. ............ 380/49 |
| 5,444,782 | 8/1995 | Adams, Jr. et al. ............ 380/49 |
| 5,489,896 | 2/1996 | Sofer et al. ............ 340/825.05 |
| 5,499,297 | 3/1996 | Boebert et al. |
| 5,502,766 | 3/1996 | Boebert et al. |
| 5,537,099 | 7/1996 | Liang ............ 370/94.1 X |
| 5,548,646 | 8/1996 | Aziz et al. ............ 380/23 |
| 5,548,649 | 8/1996 | Jacobson ............ 380/49 |
| 5,550,984 | 8/1996 | Gelb ............ 395/187.01 X |
| 5,557,346 | 9/1996 | Lipner et al. |
| 5,557,765 | 9/1996 | Lipner et al. |
| 5,583,940 | 12/1996 | Vidrascu et al. ............ 380/492 |
| 5,590,201 | 12/1996 | Lo ............ 380/49 |
| 5,596,718 | 1/1997 | Boebert et al. ............ 395/187.01 |
| 5,600,722 | 2/1997 | Yamaguchi et al. ............ 380/21 |
| 5,623,601 | 4/1997 | Vu ............ 395/187.01 |

OTHER PUBLICATIONS

Diffie, et al., Authentication and Authenticated Key Exchanges, Design, Codes, and Cryptogrpahy, 2, pp. 107–125 (1992).

Konigs, Cryptographic Identification Methods for Smart Cards in the Process of Standardization, IEEE Communications Magazine, vol. 29, No. 6, pp. 42–48 (Jun. 1991).

Ferreira, The Smart Card: A High Security Tool in EDP, Phillips TDS Review, vol. 47, No. 3, pp. 1–19, (Sep. 1989).

Day, et al., *The OSI Reference Model*, Proceedings of the IEEE, vol. 71, No. 12, pp. 1334–1340 (Dec. 1983).

Bellovin, Security Problems in the TCP/IP Protocol Suite, Computer Communication Review, Col. 19, No. 2, pp. 32–40 (Apr. 1989).

Balenson, *Privacy Enchantment for Internet Electronic Mail: Part III: Algorithms, Modes, and Identifiers*, Network Working Group, RFC 1115 (Feb. 1993).

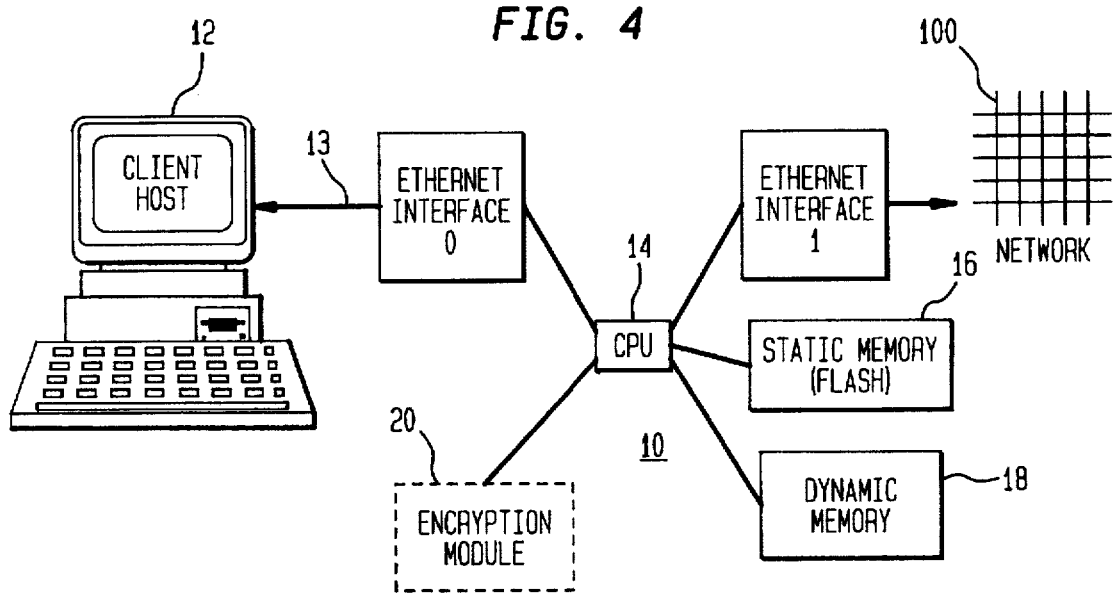

NETWORK SECURITY DEVICE WHICH PERFORMS MAC ADDRESS TRANSLATION WITHOUT AFFECTING THE IP ADDRESS

FIELD OF THE INVENTION

The present invention is directed to a network security device that is connected between a protected computer (the client) and a network and a method for utilizing the network security device. The network security device negotiates a session key with any other protected client. Then, all communications between the two clients are encrypted. The inventive device is self configuring and locks itself to the IP (Internet Protocol) address and MAC (Media Access Control) address of its client. The client cannot change its IP or MAC address once set. Thus, the inventive network security device does not allow a client to emulate another client by setting a false IP or MAC address.

BACKGROUND OF THE INVENTION

A. Network Architecture

An internet communications network 100 is depicted in FIG. 1 including five transmit or backbone networks A,B, C,D, and E and three stub networks R, Y, and Z. A "backbone" network is an intermediary network which conveys communicated data from one network to another network. A "stub" network is a terminal or endpoint network from which communicated data may only initially originate or ultimately be received. Each network, such as the stub network R, includes one or more interconnected subnetworks I, J, L and M. As used herein, the term "subnetwork" refers to a collection of one or more nodes, e.g., (d),(a)(b, x,y),(q,v)(r,z), (s,u), (e,f,g),(h,i),(j,k,l),(m,n), and (o,p), interconnected by wires and switches for local internodal communication. Each subnetwork may be a local area network or LAN. Each subnetwork has one or more interconnected nodes which may be host computers ("hosts") u,v,w,x,y,z or routers a,b,c,d,e,f,g,h,i,j,k,l,m,n,o,p,q,r,s. A host is an endpoint node from which communicated data may initially originate or ultimately be received. A router is a node which serves solely as an intermediary node between two other nodes; the router receives communicated data from one node and retransmits the data to another node. Collectively, backbone networks, stub networks, subnetworks and nodes are referred to herein as "internet systems".

FIG. 2 shows a block diagram of a host or router node 10. As shown, the node may include a CPU 11, a memory 12 and one or more I/O ports (or network interfaces) 13-1, 13-2, . . . , 13-N connected to a bus 14. Illustratively, each I/O port 13-1, 13-2, . . . , 13-N is connected by wires, optical fibers, and/or switches to the I/O port of another node. The I/O ports 13-1, 13-2, . . . , 13-N are for transmitting communicated data in the form of a bitstream organized into one or more packets to another node and for receiving a packet from another node. If the host 10 is a host computer attached to a subnetwork which is an Ethernet, then the host will have one I/O port which is an Ethernet interface. A host which initially generates a packet for transmission to another node is called the source node and a host which ultimately receives the packet is called a destination node. Communication is achieved by transferring packets via a sequence of nodes including the source node, zero or more intermediary nodes, and the destination node, in a bucket brigade fashion. For example a packet may be communicated from the node w to the node c, to the node d, to the node b, and to the node x.

An exemplary packet 40 is shown in FIG. 3A having a payload 41 which contains communicated data (i.e., user data) and a header 42 which contains control and/or address information. Typically, the header information is arranged in layers including an IP layer and a physical layer.

The IP layer typically includes an IP source address, an IP destination address, a checksum, and a hop count which indicates a number of hops in a multihop network. A physical layer header includes a MAC address (hardware address) of the source and a MAC address of the destination.

The user data may include a TCP (Transfer Control Protocol) packet including TCP headers or a UDP (User Data Protocol) packet including UDP headers. These protocols control among other things, the packetizing of information to be transmitted, the reassembly of received packets into the originally transmitted information, and the scheduling of transmission and reception of packets (see e.g., D. Commer, "Internetworking With TCP/IP", Vol. 1 (1991); D. Commer and D. Stevens, "Internetworking With TCP/IP", Vol. 2 (1991)).

In an exemplary internet protocol call IP, each node of the Internet 100 is assigned an internet (IP) address which is unique over the entire internet 100 such as the internet address for the node y shown in FIG. 3B. See, Information Sciences Institute, RFC 791 "Internet Protocol", September, 1981. The IP addresses are assigned in a hierarchical fashion; the internet (IP) address of each node contains an address portion 31 indicating the network of the node, an address portion 32 indicating a particular subnetwork of the node, and a host portion 33 which identifies a particular host or router and discriminates between the individual nodes within a particular subnetwork.

In an internet 100 which uses the IP protocol, the IP addresses of the source and destination nodes are placed in the packet header 42 by the source node. A node which receives a packet can identify the source and destination nodes by examining these addresses.

B. Encryption Techniques

Eavesdropping in a network, such as the network 100 of FIG. 1, can be thwarted through the use of a message encryption technique. A message encryption technique employs an encipherment function which utilizes a number referred to as a session key to encipher data (i.e., message content). Only the pair of hosts in communication with each other have knowledge of the session key, so that only the proper hosts, as paired on a particular conversation, can encrypt and decrypt digital signals. Two examples of encipherment functions are the National Bureau of Standards Data Encryption Standard (DES) (see e.g., National Bureau of Standards, "Data Encryption Standard", FIPS-PUB-45, 1977) and the more recent Fast Encipherment Algorithm (FEAL)(see e.g., Shimizu and S. Miyaguchi, "FEAL-Fast Data Encipherment Algorithm," Systems and Computers in Japan, Vol. 19, No. 7, 1988 and S. Miyaguchi, "The FEAL Cipher Family", Proceedings of CRYPTO '90, Santa Barbara, Calif., August, 1990). Another encipherment function is known as IDEA. One way to use an encipherment function is the electronic codebook technique. In this technique a plain text message m is encrypted to produce the cipher text message c using the encipherment function f by the formula $c=f(m,sk)$ where sk is a session key. The message c can only be decrypted with the knowledge of the session key sk to obtain the plain text message $m=f(c,sk)$.

Session key agreement between two communications hosts may be achieved using public key cryptography. (See e.g., U.S. Pat. Nos. 5,222,140, and 5,299,263).

Before discussing public key cryptographic techniques, it is useful to provide some background information. Most practical modern cryptography is based on two notorious mathematical problems believed (but not proven) to be hard (i.e., not solvable in polynomial time, on the average). The two problems are known as Factorization and Discrete-Log. The Factorization problem is defined as follows:

Input: N, where N=pq where p and q are large prime numbers

Output: p and/or q.

The Discrete-Log problem is defined as follows:

Input: P,g,y, where $y \equiv g^x$ mod P, and P is a large prime number

Output: x.

(The Discrete-Log problem can be similarly defined with a composite modulus N=pq).

Based on the Factorization and Discrete-Log problems, some other problems have been defined which correspond to the cracking problems of a cryptographic system.

One system of such a problem which has previously been exploited in cryptography (see, e.g., H. C. Williams, "A Modification of RSA Public-Key Encryption", IEEE Transactions on Information Theory, Vol. IT-26, No. Nov. 6, 1980) is the Modular Square Root problem, which is defined as follows:

Input: N,y, where $y \equiv x^2$ mod N, and N=pg, where p and q are large primes Output: x.

Calculating square roots is easy if p and q are known but hard if p and q are not known. When N is composed of two primes, there are in general four square roots mod N. As used herein, $z \equiv \sqrt{x}$ mod N is defined to mean that x is the smallest integer whereby $z^2 \equiv x$ mod N.

Another problem is known as the Composite Diffie-Heliman (CDH) problem, which is defined as follows:

Input: N, g, $g^x$ mod N, $g^y$ mod N, where $N \equiv pq$ and p and q are large primes.

Output: $g^{xy}$ mod N.

It has been proven mathematically, that the Modular Square Root and Composite Diffie-Hellman problems are equally difficult to solve as the abovementioned factorization problem (see, e.g., M. O. Rabin, "Digitalized Signatures and Public Key Functions as Intractable as Factorization", MIT Laboratory for Computer Science, TR 212, January 1979; Z. Shmuely, "Composite Diffie-Hellman Public Key Generating Schemes Are Hard To Break", Computer Science Department of Technion, Israel, TR 356, February 1985; and K. S. McCurley, "A Key Distribution System Equivalent to Factoring", Journal of Cryptology, Vol. 1, No. 2, 1988, pp. 95–105).

In a typical public-key cryptographic system, each user i has a public key $P_i$ (e.g., a modulus N) and a secret key $S_i$ (e.g., the factors p and q). A message to user i is encrypted using a public operation which makes use of the public key known to everybody (e.g., squaring a number mod N). However, this message is decrypted using a secret operation (e.g., square root mod N) which makes use of the secret key (e.g., the factors p and q).

C. Network Security Devices

At present, the existing network security products are categorized into two classes: (1) firewalls, such as Janus and ANS and (2) software products, such as encrypted mail, secured http, one time password, etc.

The firewall is a dedicated computer, usually running a Unix operating system. It acts as a filter for incoming and outgoing communications. The firewall is placed as a router between the local area network (LAN) and the outside world. The decision whether to pass a packet is made based on the source and/or destination IP address, and the TCP port number. Some firewalls also have the ability to encrypt data, providing that both sides of the communication employ the same brand of firewall. Some firewalls have a personal authentication feature.

Software products are based on the premise that the computer on which they are installed are secured, and protection is only needed outside on the network. Thus, such software products can easily be bypassed by breaking into the computer. A typical scheme is when an intruder implants a "Trojan Horse" on a computer which sends him an unencrypted copy of every transaction. Sometimes, it is even done as a delayed action during the off-hours when the computer is not likely to be supervised.

In addition, there are authentication products designed to maintain the integrity of the computer against intrusion. These products are based on the premise that they are 100% secured. Once the product is compromised, it becomes totally ineffective. Sometimes, careless use by one user may jeopardize all other users of the product.

Firewalls are more effective in maintaining network security. However they are very expensive. Their price range is between $10,000 and $50,000, plus the price of the hardware. They require a high level of expertise to install and maintain. The most sophisticated and effective firewalls require a specially trained technician or engineer for their maintenance. The special training cost is up to $10,000 per person, and the salary adds $60,000 to $120,000 or more per annum to the cost.

Firewalls have to be constantly maintained, modified, and monitored in order to yield reasonable security. They only cover the TCP part of the Internet Protocol and not the UDP part. Thus, they do not provide security to NFS (Network File Services) and many client/server applications.

The firewall is a full service computer which can be logged into for maintenance and monitoring. Thus, it can be broken into. Once a firewall is compromised it loses its effectiveness and becomes a liability rather than a security aid. A firewall only protect the connection between a LAN and a WAN (Wide Area Network). It does not protect against intrusion into a particular host from within the LAN.

In view of the foregoing, it is an object of the present invention to provide a network security device which overcomes the shortcomings of the prior art network security devices.

In particular, it is an object of the present invention to provide a hardware device to provide network security for individual hosts attached to a network.

SUMMARY OF THE INVENTION

The network security device of the present invention comprises a first network interface connected to a protected client, a second network interface connected to a portion of a network, and a processing circuit connected to both interfaces. Illustratively, the portion of the network to which the protected client is connected is an Ethernet and the first and second network interfaces are Ethernet interfaces. The processing circuit connected in between the two interfaces may be a conventional CPU such as an Intel 486 DX2-66 or a Pentium. Alternatively, the processing circuit may be implemented as one or more ASICs (Application Specific Integrated Circuits) or a combination of ASICs and a CPU. A communication from the protected,) client, goes from the client, to the first interface, to the processing circuit, to the second interface and into the network. Similarly, a communication received from the network, goes from the second interface, to the processing circuit, to the first interface and to the protected client.

Preferably, the network security device is a sealed device and it cannot be logged into. It has the same IP address as the protected client.

A number of important functions are performed by the inventive network security device. The network security device learns the MAC and/or IP address of its client and locks itself to these addresses. To lock, the MAC and/or IP address is stored in a permanent memory of the network security device. A packet arriving from the client will not be passed into the network if the packet has a MAC and/or IP address different from that which is stored in memory. Thus, the protected client is unable to change its MAC and/or IP address. This prevents the protected client from emulating the MAC and/or IP address of another client in the network. When a packet arrives at the first network interface from the client, the processing circuit substitutes a MAC address of the network security device for the MAC address of the protected client. Then the packet is passed to the second interface and into the network. The same translation is performed in reverse for packets arriving at the network security device from the network side.

Packets received from the protected client are encrypted using an encipherment function such as IDEA, FEAL or DES before being transmitted via the network to a destination. Similarly encrypted packets received from a destination are decrypted. Such encryption and decryption requires a common session key to be possessed jointly by the protected client and the destination (the destination being a protected client of another network security device located someplace else in the network).

The common session key is obtained using a public key cryptography technique. Thus, both of the protected clients (hereinafter labeled i and j) have public keys $P_i$, $P_j$ and secret keys $S_i$, $S_j$. The public keys $P_i$ and $P_j$ have a static part and a dynamic part which are updated periodically. The secret keys $S_i$, $S_j$ also have a static part and a dynamic part.

To aid in the key exchange, the network security device maintains two databases. A static database contains information about secured hosts or nodes in the network. A secured host or node is a host or node that is protected by a network security device. Each entry in the static database contains information about a particular secured host, i.e., the host IP address, time entered in the database, and the host's permanent public key.

A dynamic data base contains information about secured and unsecured hosts. Each entry in the dynamic database includes a host's IP address, a flag indicating whether or not the host is secured, a flag indicating whether the host is in transition (i.e., in the middle of a key exchange), and a pointer to a common secret session key.

The protocol used by the network security device of host i to agree on a common session key with a network security device of host j is as follows.

Consider a communication from host i to host j. The communication arrives at the network security device of host i from host i. The network security device checks if host j is in the dynamic database. If host j is in the dynamic database, it is determined if the dynamic database has a common session key for communication between host i and host j. If there is such a common session key, the communication from host i is encrypted using the common session key and transmitted to host j. If there is no common session key, then host i sends the dynamic part of its public key $P_i$ to host j and host j replies by sending the dynamic part of its public key $P_j$ to host i. The exchange of dynamic parts of the public keys may be encrypted using the static part of the public keys, which may be obtained from the static databases at host i and host j. The common session key is then calculated according to a Diffie-Hellman technique for example:

Assume that $P_i = g^{Si}$ mod N where N is either prime or the product of two primes. Assume that $P_j = g^{Sj}$ mod N. After the exchange of public keys, the network security device at host i calculates $\eta = P_j^{Si} = g^{SjSi}$ mod N. Similarly, the network security device at host j calculates $\eta = P_i^{Sj} = g^{SiSj}$ mod N. Thus, both hosts i and j are in possession of the same number $\eta$. This number may then be used as a common session key or used to derive a common session key.

Note that this assumes that there is an entry for host j in the static database of host i. If there is not, the exchange of dynamic public keys is preceded by an exchange of static public keys and the forming of a database entry for host j in the static database at host i. Moreover, if there is no entry for host j in the dynamic database of host i, such an entry will be generated before the dynamic key exchange.

It should be noted that encryption takes place at the IP level so that TCP and UDP packets are encoded.

In short, the inventive network security device has a number of significant advantages.

Like a firewall, the inventive network security device is a hardware/software combination in a preferred implementation. However, it is a sealed "box" and cannot be logged into. Hence, it cannot be compromised the way a firewall can. It is much cheaper than a firewall. Thus, each node in the LAN can be equipped with it. This way, it provides protection inside the LAN as well as outside. The network security device works directly at the IP level. It therefore, covers all types of IP protocols and requires no special configuration to different network applications. Thus, the inventive network security device is maintenance free.

The inventive network security device senses the IP address of the client host and locks itself to it. It requires no installation. Once locked, it does not allow the client host to change its IP address. The inventive network security device also maintains a permanent database of secured hosts. If a request for key arbitration arrives that conflicts with the database, that host is denied communication. The combination of the above two features creates a double authentication of the IP address. The inventive security device creates a physical barrier between the client and the network. Thus, preventing attempts to bypass by direct Ethernet communications.

The inventive security device encrypts all communication to the network, including the exchange of dynamic public keys.

BRIEF DESCRIPTION OF THE DRAWINGS

FIG. 4 illustrates a network security device for use with a host in the network of FIG. 1 in accordance with an embodiment of the present invention.

FIG. 5 illustrates an entry in a static database maintained by the network security device of FIG. 4.

FIG. 6 illustrates an entry in a dynamic database maintained by the network security device of FIG. 4.

DETAILED DESCRIPTION OF THE INVENTION

Figure 1:
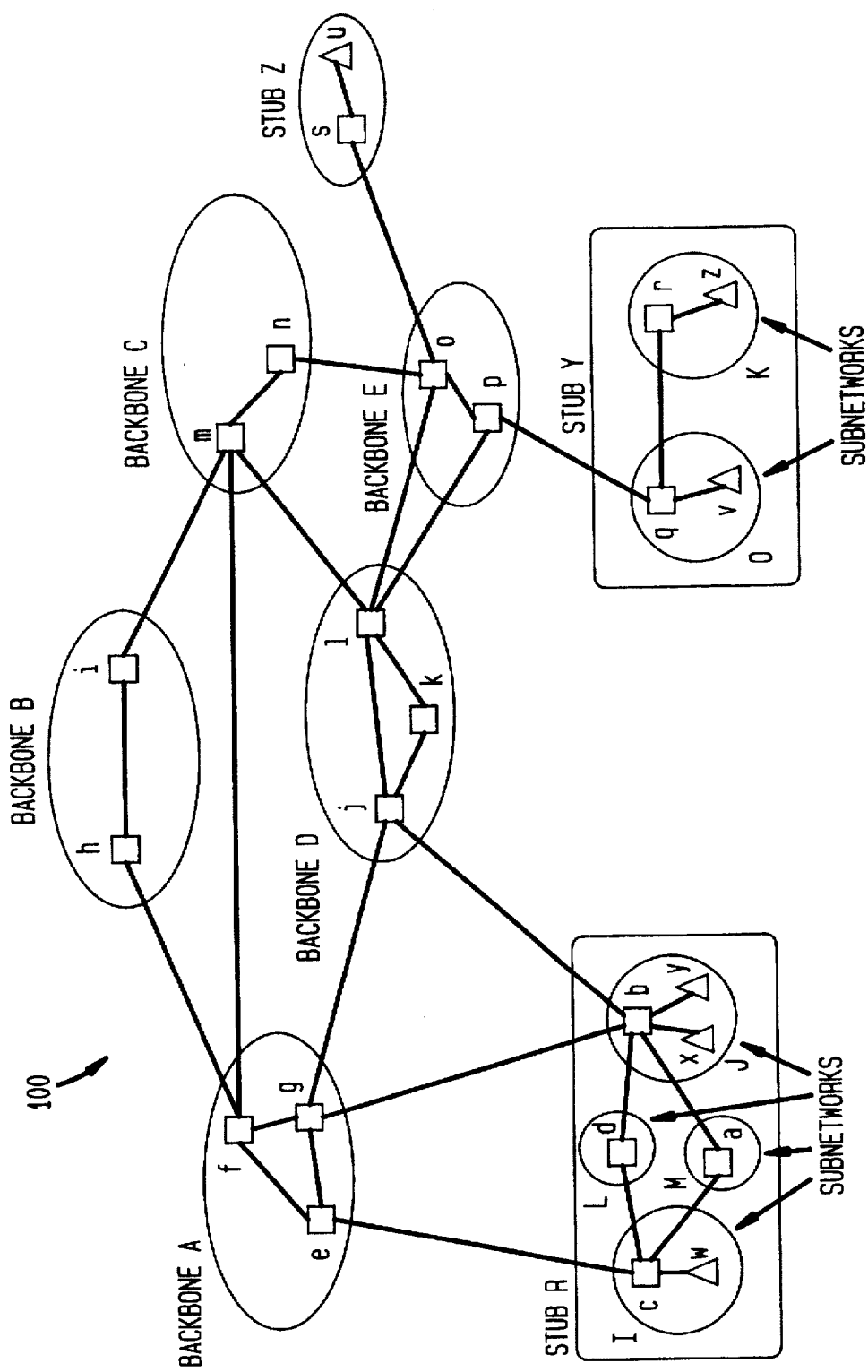
FIG. 1 schematically illustrates an internet network.
Figure 2:
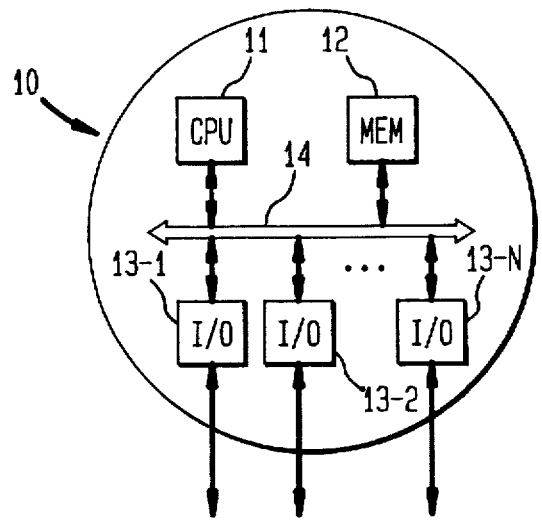
FIG. 2 schematically illustrates the architecture of a host in the network of FIG. 1.
Figure 3A:
FIGS. 3A and 3B illustrate the format of a packet transmitted in the network of FIG. 1.
Figure 3B:
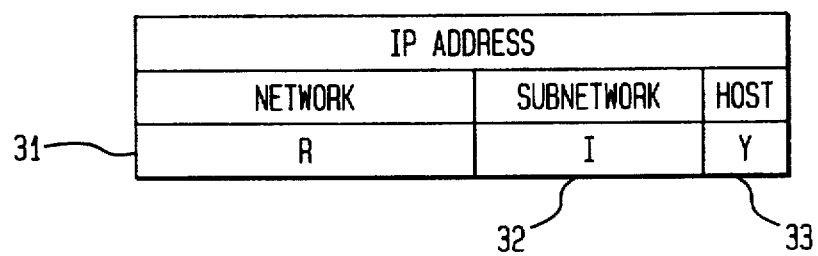

FIG. 4 schematically illustrates a network security device in accordance with an illustrative embodiment of the invention. The security device 10 comprises a first interface 0 which is connected to the client host 12. Specifically, the interface 0 is connected to a network interface in the client host 12 (e.g., an interface 13 of FIG. 2) via a cable or wire 13. The security device 10 comprises a second interface 1 which is connected to a portion of a network 100. Illustratively, the interface 1 is connected to an Ethernet so that the interfaces 0,1 are Ethernet interfaces such as SMC Elite Ultra Interfaces.

A CPU 14 is connected to the interfaces 0,1. The CPU is for example an Intel 486 DX 62–66. A static memory 16 (e.g. flash EEPROM) is connected to the CPU 14 and a dynamic memory 18 (e.g. RAM) is connected to the CPU 14. An optional encryption module 20 performs encryption and large number arithmetic operations. The encryption unit may be implemented as a programmable logic array. Alternatively, the encryption module may be omitted and its function may be carried out using a software program which is executed by the CPU 14. The interface 0 is put in a promiscuous mode. In this mode, the interface 0 passes all communications from the client host 12 that is sensed on the cable 13 to the CPU 14. The network connection is via the interface 1 which is set to the same IP address as the client 12. The network security device 10 responds to the Address Resolution Protocol by sending its own (rather than the client's) MAC address. This adds a level of security by blocking attempts to bypass the device 10 using the Ethernet protocol.

The CPU 14 maintains two databases. One database is a static database stored in the Flash ROM 16. This database contains permanent information about secured nodes in the network, i.e., the node IP address, time entered into the database, the nodes permanent public key. The structure of an illustrative record for a node in this database is shown in FIG. 5.

A second database is a dynamic database. The dynamic database contains information about secured and unsecured nodes, i.e., the node IP address, time last updated, a flag indicating whether the node is secured (e.g., has its own network security device), a flag indicating whether the node is in transition (i.e., in the middle of a key exchange), a pointer to a common secret key with that node. The structure of an illustrative record for a node in this database is shown in FIG. 6. The transition flag has three possible values, 0-not in transition, 1-pending reply from remote host, and 2-pending computation of a common key.

The software executed by the CPU 14 has three components: (1) operating system, (2) networking system, (3) key computation algorithms. The operating system and the networking system are both part of a Unix like kernal. The key computation algorithm reside in memory and are signalled into action by the networking system. The operating system is a lobotomized Linux system with all drivers taken out except the RAM, disk and Ethernet interfaces. The networking system is for communication, key exchange, encryption, configuration, etc.

Figure 7:
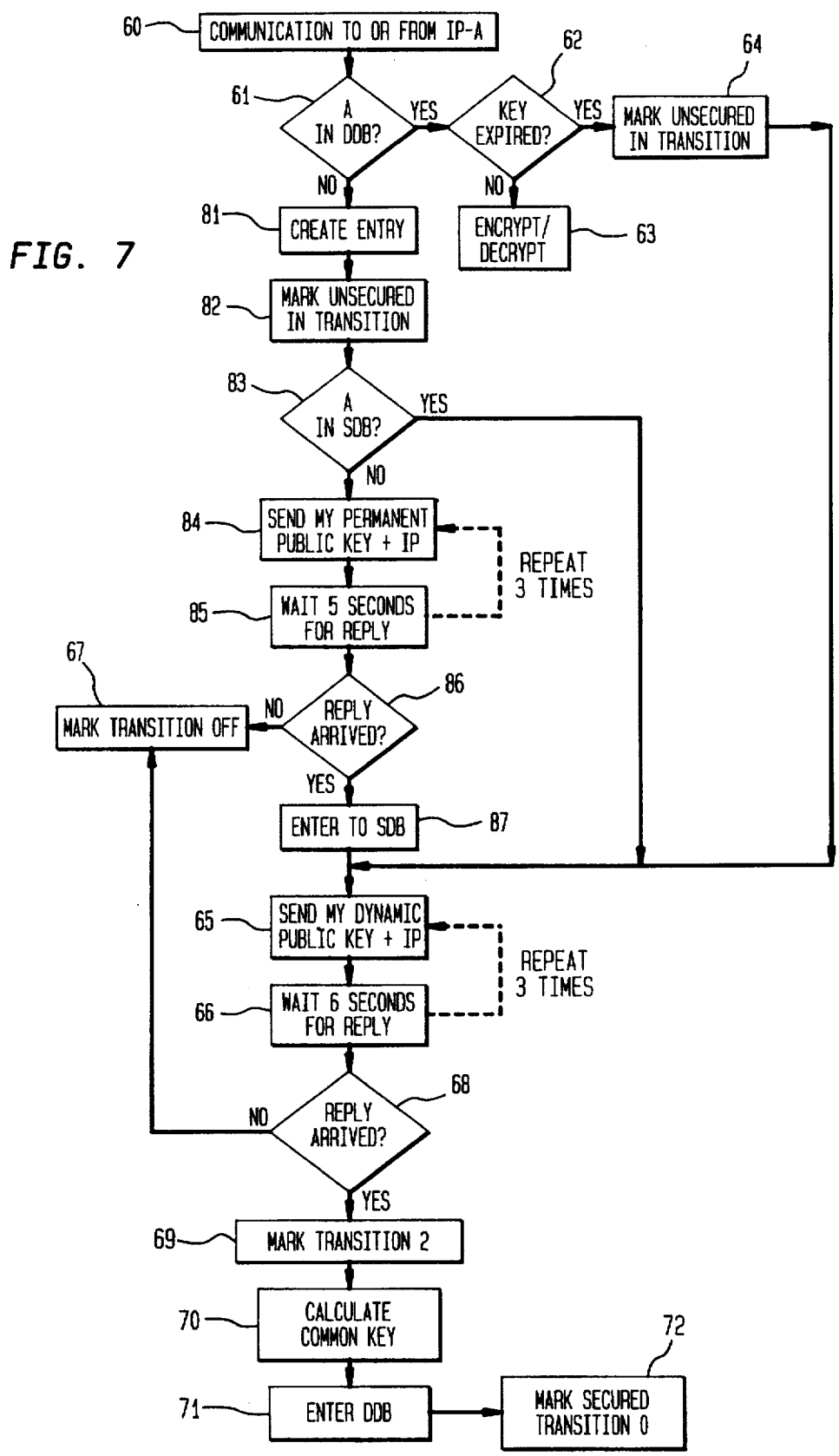
FIG. 7 is a flow chart which illustrates a key exchange algorithm utilized by the network security device of FIG. 4.

The key exchange algorithm is illustrated in FIG. 7. Consider the case where the host client wants to send a communication to a node in the network while IP=A. When the communication arrives at the network security device of the host client (step 60 of FIG. 6), the dynamic data base (DDB) is checked to determine if there is an entry for node A in the dynamic data base (step 61). If there is an entry for node A in the dynamic data base, a check is made to see if a common session key for node A and the protected client has expired (step 62).

If the common session key has not expired the packet is encrypted using the session key and an encipherment function such as IDEA (step 63). If the common session key has expired, the dynamic data base entry for the node IP=A is marked as unsecured and in transition (step 64) which means a key exchange is taking place. The transition flag=1.

The exchange of the dynamic parts of the public keys of the host client and the node with IP=A proceeds as follows. The host client (i.e., the source) sends its dynamic public key and IP address to the node with IPR=A (the destination) (step 65) and waits five seconds for a reply (step 66). The dynamic public key of the host may be encrypted with the static public key of the node with IP=A. The reply is the dynamic public key of the destination node with IP=A. This may be encrypted with the static public key of the host client. The steps 65 and 66 are repeated three times.

If no reply is received (step 68) from the destination, the source network security device marks the transition off (step 67) in the DDB entry for the destination.

If a reply is received the transition flag for the destination in the DDB of the network security device of the host is set to 2 (step 69), indicating the common session key is being calculated. Then a common session key for the source and destination is calculated by the network security device of the source (step 70) using for example a Diffie-Heliman technique as described above. The common session key is then entered into the DDB of the source network security device (step 71) and the transition flag for this DDB entry is marked 0 (step 72), because the transition is complete.

The exchange of dynamic public keys and the calculation of a common session assumes that there is an entry for the destination node with IP=A in the static data base (SDB) of the source network security device and in the dynamic data base of the source network security device. If these entries do not exist, they may be created prior to dynamic public key exchange (steps 65–69).

If there is no DDB entry for node IP=A, (step 61) an entry is created (step 81) and the transition flag for this entry is marked unsecured and in transition (step 82). A check is then made to determine if the SDB of the source network security device has an entry for node IP=A (step 83). If there is such an entry, proceed with dynamic key exchange (step 65 etc.). The source network security device transmits the permanent public key of the source to node IP=A (step 84) and waits five seconds for a reply (step 85). The steps 84 and 85 may be repeated several, e.g., three times.

If a reply is received (step 86), an entry is created in the SDB (step 87). If no reply is received, the transition flag in the entry in the DDB is marked transition off (step 67).

As indicated above in a preferred embodiment, the network security device is a sealed box which cannot be logged into. The network security device 10 senses the IP (and/or MAC) address of the client host 12 and locks itself to it. Once the network security device is locked to the address, the client is prevented by the network security device from changing its IP (and/or MAC) address.

The Address Resolution Protocol (ARP) is the protocol which is used to resolve an IP address into a matching Ethernet machine (MAC) address which is the actual address to which the network interface responds.

The inventive network security device uses ARP (Address Resolution Protocol) to configure itself and hide the client host.

Figure 8:
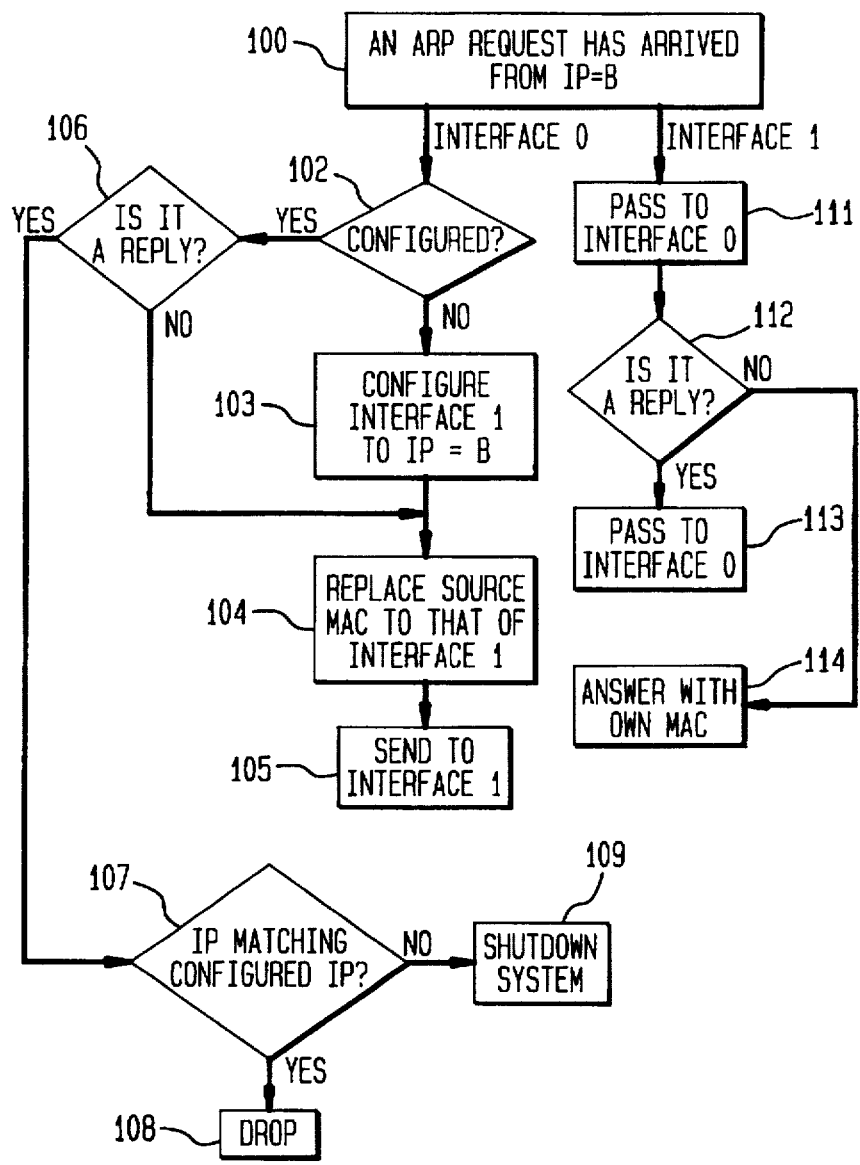
FIG. 8 is a flow chart of an ARP handling algorithm utilized by the network security device of FIG. 4.

FIG. 8 Shows how the inventive network security device processes an ARP request with IP=B. The request may arrive from the host at interface 0 from the network at interface 1 (step 100). If the request arrives via interface 0, the network security device determines if it is configured (step 102). If the network security device is not configured, it configures itself (step 103). Configuration involves storing in a permanent memory, the IP address and/or the MAC address of the host. After configuration, the CPU in the network security device replaces the MAC address of the source with the MAC address of interface 1 (step 104) and sends the request to interface 1 (step 105). The request is then transmitted to its destination via the network.

If the host's network security device is already configured (step 102), it is determined if the request is a reply (step 106). This is done by checking the destination MAC field. In a reply this field is not zero. If the request is not a reply, MAC address translation takes place according to step 104 and the request is sent to interface 1 (step 105) for transmission into the network. If the request is a reply, it is determined if the source IP address in the request matches the IP address now permanently stored in memory (step 107). If there is a match, the request is dropped (step 108) since the network security device has already answered the ARP. If there is not a match, the system is shut down (step 109).

If the request arrives via the network at interface 1, the request is passed to interface 0 (step 111). If the request is a reply (step 112), pass the request to the interface 0 (step 113). If the request is not a reply, the request is answered using the MAC address of interface 1 (step 114).

Figure 9:
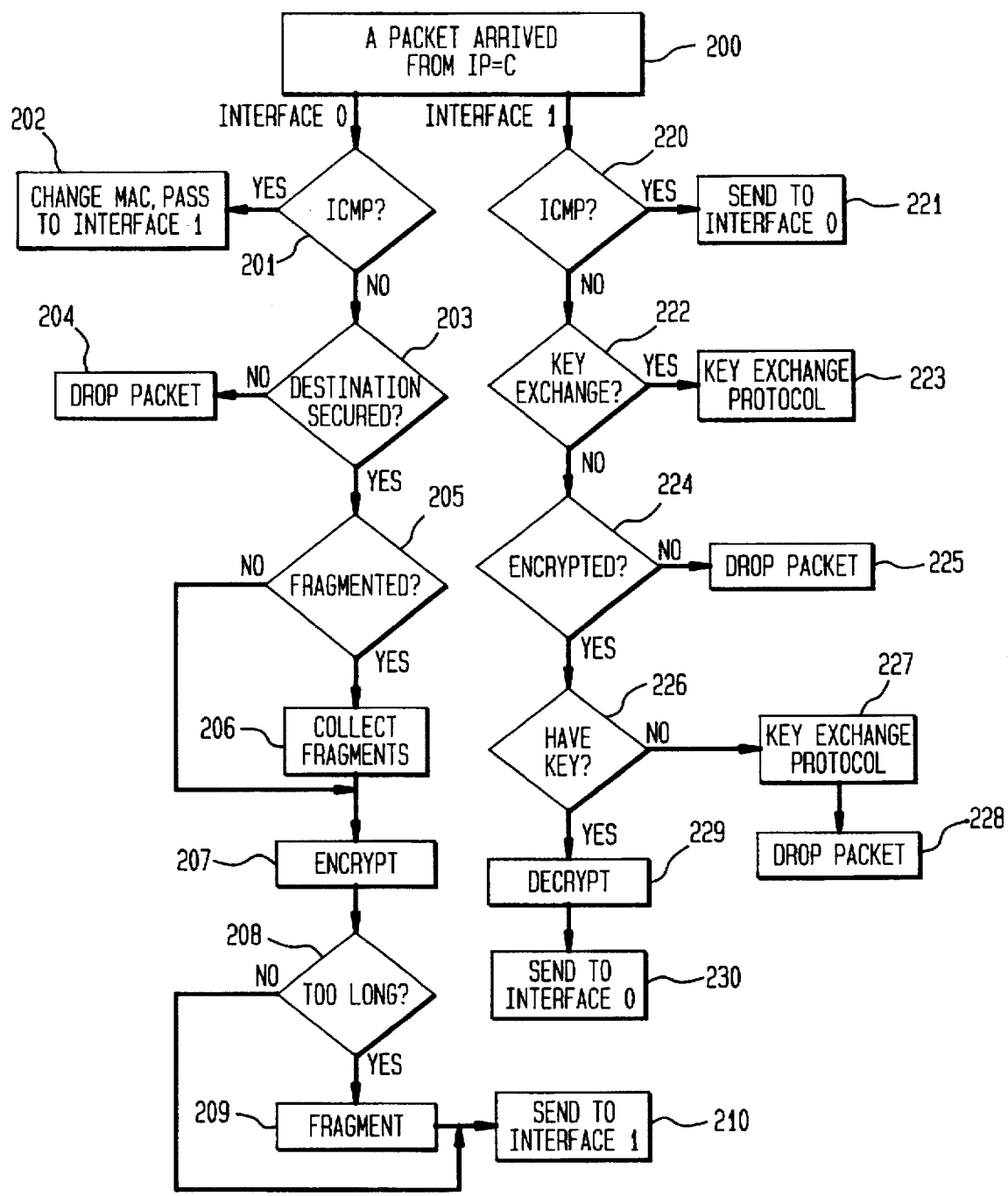
FIG. 9 is a flow chart of an IP packet handling algorithm utilized by the network security device of FIG. 4.

FIG. 9 illustrates a packet handling algorithm utilized by the inventive network security device. Illustratively the packet arrives with the source address IP=C (step 200). The packet may arrive from the host at interface 0 from the network at interface 1.

First consider the case where the packet arrives from the host at interface 0. If the packet carries an ICMP (Internet Control Message Protocol) or IGMP (Internet Gateway Message Protocol) identification (step 201), the packet is passed to the interface 1 without encryption. However, the source MAC address in the packet is translated to the MAC address of interface 1 (step 202). ICMP not addressed to a destination host. Rather these packets are utilized by intermediate entities in the network, e.g., routers, for various functions.

If the destination to which the packet is addressed is insecure, the packet is dropped (step 203, 204). The device may be in a secured/unsecured mode (special order). In such case the packet will be sent unchanged.

Next, it is determined if the packet contains a part of a message that has been fragmented (step 205). If the packet contains a fragment, the fragments are collected (step 206) and the message is encrypted (step 207). The encryption takes place using the common session key and an encipherment function. If the encrypted message is too long for the particular LAN (step 208), it is fragmented (step 209). An encrypted packet is then transmitted to interface 1 for transmission into the network (step 210). An encrypted packet carries a signature in the protocol IS part of the IP header.

This indicates that the packet is encrypted. The IP address of a packet is not encrypted, otherwise the packet could not be routed through the network.

The case where the packet arrives via the network at interface 1 is now considered. If the packet is an ICMP or IGMP packet (step 220) no decryption is necessary and the packet is sent to interface 0 (step 221). If the packet is a key exchange packet (step 222) the packet is processed according to the key exchange protocol (step 223). If the packet is not encrypted (step 224) the packet is dropped (step 225). The device may be in a secured/unsecured mode (special order). In such case the packet will be sent to the client unchanged. If the packet is encrypted but the network security device does not have the key (step 226), the key exchange protocol is carried out (step 227) and the packet is dropped (step 228). If the key is available in the dynamic data base of the network security device, the packet is decrypted (step 229) and sent to interface 0 (step 230).

For packets received from the network the MAC address of the network security device is translated into the MAC address of the client. For packets received from the protected client, the MAC address of the client is translated into the MAC address of the network security device.

In short, a unique network security device has been disclosed. Finally, the above described embodiments of the invention are intended to be illustrative only. Numerous alternative embodiments may be devised by those skilled in the art without departing from the scope of the following claims.

We claim:

1. A network security device which does no routing and is configured to protect at least one particular node, the node having a first media access control (MAC) address and an Internet address and which communicates via a network, comprising:

a. a first interface connected to the at least one particular node and having said first MAC address of the node;

b. a second interface connected to the network and having a second MAC address, and c. a processing circuit connected to said first and second interfaces, said processing circuit:

(1) for a packet received at said first interface from said one particular node and the packet having a header containing a source address that is the Internet address of the at least one particular node and said first MAC address of said one particular node, the circuit configured to replace the first MAC address contained in the received packet header with the second MAC address before said packet is transmitted into said network and leaving the Internet address unencrypted and its position in the packet header unchanged, and (2) for a packet received at said second interface from said network and the packet having a header containing a destination address that is the Internet address of the at least one particular node and said second MAC address of said second interface, the circuit configured to replace the second MAC address contained in the received packet header with said first MAC address of said at least one particular node before said packet is transmitted to the at least one particular node, and leaving the Internet address unencrypted and its position in the packet header unchanged.

2. The network security device of claim 1 wherein said first and second interfaces are Ethernet interfaces.

3. The network security device of claim 1 wherein said processing circuit encrypts user data contained in said packet received from said at least one particular node, while said IP address contained in said header of said packet received from said at least one particular node remains unencrypted and the portion of said IP address in said header of said packet remains unchanged.

4. The network security device of claim 3 wherein said packet is a TCP packet including a TCP packet header and the TCP packet header is encrypted.

5. The network security device of claim 3 wherein said packet is a UDP packet including a UDP packet header and the UDP packet header is encrypted.

6. The network security device of claim 3 wherein said processing circuit encrypts said user data using a session key and an encipherment function.

7. The network security device of claim 1 wherein said network security device maintains a first database containing information indicating an IP address and a permanent public key for one or more nodes in said network.

8. The network security device of claim 7 wherein said network security device maintains a second database indicating for one or more nodes in said network, an IP address, and a common session key with said at least one particular node.

9. The network security device of claim 8 wherein one or more nodes in said second database are unsecured nodes.

10. A network security device configured to protect at least one particular node, the node having an Internet address and which communicates via a network, comprising:
    a. a first interface connected to the at least one particular node and having a first MAC address,
    b. a second interface connected to the network and having a second MAC address, and
    c. a processing circuit connected to said first and second interfaces, said processing circuit:
        (1) for a packet received at said first interface from said one particular node and the packet having a header including a source address that is the Internet address of the at least one particular node and said first MAC address, the circuit configured to translate the first MAC address in the received packet header into the second MAC address before said packet is transmitted into said network by said second network interface and leaving the Internet address of the received packet header unencrypted; and
        (2) for a packet received at said second interface from said network and the packet having a header including a destination address that is the Internet address of the at least one particular node and said second MAC address of said second interface, the circuit configured to translate the second MAC address in the received packet header into the first MAC address before said packet is transmitted to said at least one particular node and leaving the Internet address of the received packet header unencrypted.

11. A method for transmitting a packet into a network comprising the steps of:
    (1) generating a packet containing a first source MAC address of a first node, a first source IP address of said first node and a second IP address of a destination, and user data,
    (2) in a network security device which does no routing and is connected to said network and having said first IP address, translating said first source MAC address into a second MAC address of said network security device, encrypting said user data, while leaving said IP address of said destination unencrypted and in the same respective position in a header of said packet, wherein the step of encrypting comprises negotiating a session key common to said first node and second node, said negotiating step comprising:
        a. at said network security device, using a static public key of said second node, encrypting a dynamic public key of said first node and transmitting said dynamic public key of said first node to said second node,
        b. receiving from said second node a dynamic public key of said second node encrypted with a static public key of said first node and decrypting said dynamic public key of said second node with a static secret key of said first node at said network security device,
        c. at said network security device, generating said common session key from a dynamic secret key of said first host and said dynamic public key of said first node and said dynamic public key of said second node; and
    (3) transmitting said packet into said network.

12. The method of claim 11 wherein said first node maintains a static database containing information which identifies static public keys of other nodes in said network and from which said network security device obtains said static public key of said second node.

13. The method of claim 12 wherein said network security device maintains a dynamic database including an indicator of said common session key.

14. A method for transmitting a packet into a network comprising the steps of:
    (1) generating a packet whose header contains a first source media access control (MAC) address of a host, an IP address of a destination, and user data,
    (2) in a network security device which does no routing and is connected to said network, translating said first MAC address of said host into a second MAC address of said network security device and retaining the IP address of said destination unencrypted and in its respective position in said header, and
    (3) transmitting said packet into said network.

15. The method of claim 14 further comprising the step of in said network security device encrypting said user data, while leaving said IP address of said destination unencrypted and retaining said IP address of said destination in its respective position in said header.

16. The method of claim 14 wherein said user data includes a TCP packet.

17. The method of claim 14 wherein said user data includes a UDP packet.

18. A method for transmitting a packet into a network comprising the steps of:
    (1) generating a packet having a header containing a first MAC address, an IP address of a destination, and user data,
    (2) in a network security device which does no routing and is connected to said network, translating said first MAC address into a second MAC address of said network security device,
    (3) encrypting the user data and not the IP address and retaining as unchanged said IP address and its position in said header, and
    (4) transmitting said packet into said network.

19. A network security device connected between: (1) a node having an Internet address and (2) a communication network, the device comprising:

(a) a first interface connected to at least one node, the first interface having a first media access control (MAC) address;

(b) a second interface connected to the communication network and having a second MAC address;

(c) a processor connected to the first and second interfaces, the processor configured to:

(1) receive a packet from the first interface, the packet having a transport layer header, a network layer header, and the first MAC address; the processor configured to replace the first MAC address with the second MAC address in the received packet, to encrypt the received transport layer header, and to not encrypt the received network layer header; and to transmit the packet to the second interface; and (2) receive a packet from the second interface, the packet having an encrypted transport layer header, an unencrypted network layer header, and the second MAC address; the processor configured to replace the second MAC address with the first MAC address in the received packet, decrypt the packet including the transport layer header, and to transmit the packet to the first interface.

\* \* \* \* \*